April 6, 1965   E. L. MUDD   3,176,425
FISHING TACKLE RETRIEVER
Filed Feb. 4, 1963
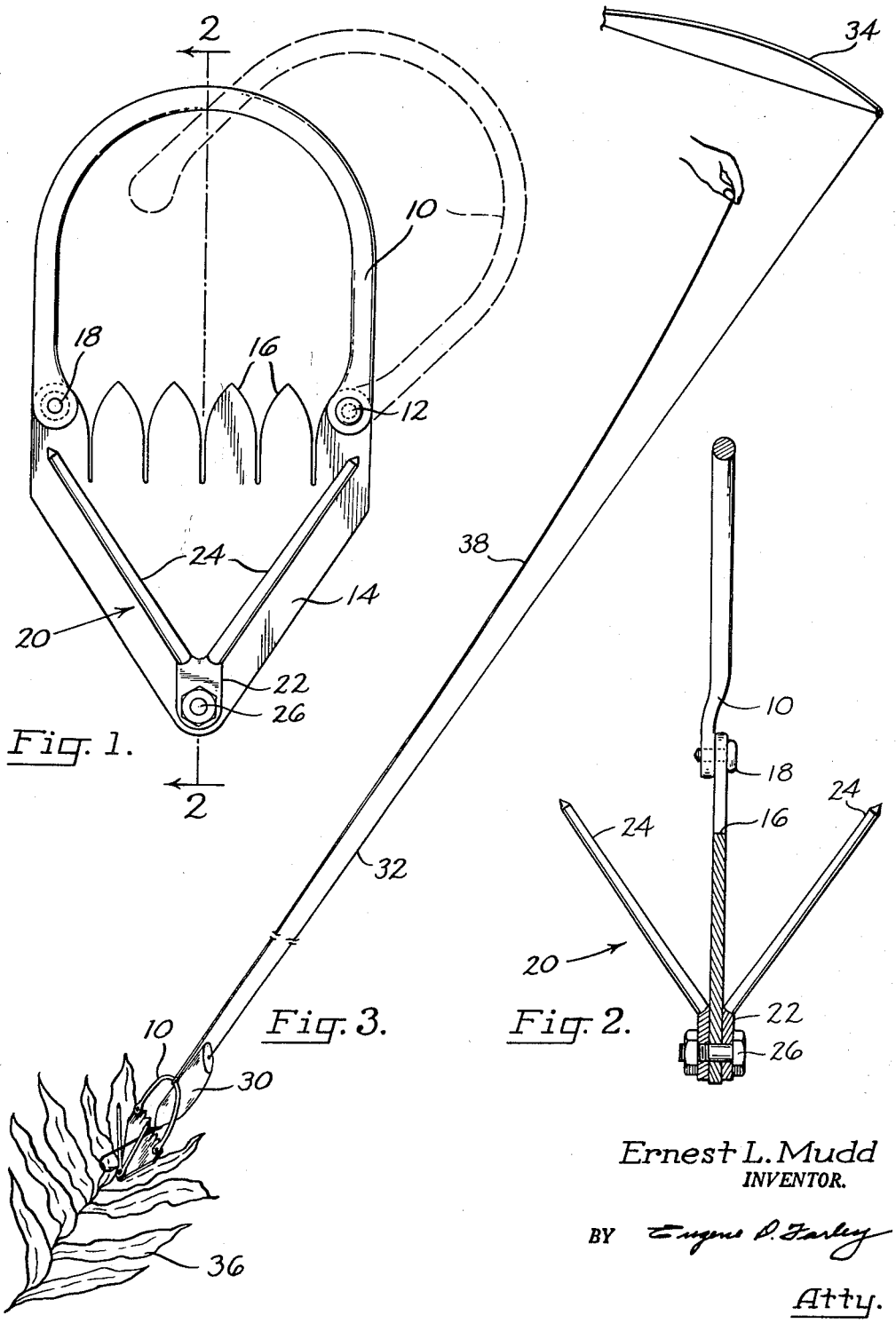
Ernest L. Mudd
INVENTOR.
BY Eugene O. Farley
Atty.

United States Patent Office 3,176,425
Patented Apr. 6, 1965

3,176,425
FISHING TACKLE RETRIEVER
Ernest L. Mudd, Rte. 5, Box 388, Port Orchard, Wash.
Filed Feb. 4, 1963, Ser. No. 255,907
3 Claims. (Cl. 43—17.2)

As is well known to all fishermen, it is not at all uncommon when fishing in lakes and rivers for the lure or bait to become fouled on underwater snags. This is particularly true where the lakes are man-made reservoirs and have bottoms abundantly provided with submerged trees, stumps and brush.

Since the multiple spinners and other lures which conventionally are used on such lakes are costly, and since it is not difficult to lose three or four lures a day under the described conditions, the pleasant prospect of catching the large fish which frequent such areas is overshadowed by the unpleasant prospect of losing a quantity of expensive gear.

It is the object of the present invention to provide a retriever for use in the retrieval of tackle lost in such situations, the retriever being highly efficient in its operation, easy to use and inexpensive to manufacture.

The manner in which the foregoing and other objects of this invention are accomplished will be apparent from the accompanying specification and claims considered together with the drawings, wherein:

FIG. 1 is a plan view of the presently described retriever;

FIG. 2 is a sectional view taken along line 2—2 of FIG. 1; and

FIG. 3 is a view illustrating the manner of use of the retriever in releasing a snagged fishing lure.

Broadly stated, the fishing tackle retriever of the invention comprises a weighted, discontinuous frame which is adjustable between open and closed positions. In the open position a snagged line may be inserted in the ring. Means are provided for releasably locking the frame in its closed position, containing the line.

The retriever also is provided with teeth suitable for engaging the lure. Accordingly, after insertion of the snagged line, the retriever may be fastened to a retriever line and lowered to the snagged lure, which the teeth thereupon engage. Upon pulling upwardly on the retriever line, the lure may be disengaged from the snag, or the latter may be drawn to the surface along with the lure.

Considering the foregoing in greater detail and with particular reference to the drawings:

The fishing tackle retriever of my invention is mounted in a weighted, discontinuous frame which preferably comprises a substantially symmetrical smooth arcuate rod or bail 10. Although its dimensions may be varied as required by particular applications, the bail may be made of 3/16 inch rod or bar stock having a length of 8 to 12 inches.

One end of the bail is hinged by means of pin 12 to tooth means which are provided for engaging the snagged lure or the obstruction on which the lure is snagged. Such tooth means preferably comprise a serrated plate 14 having a plurality of teeth 16 arranged in a row. The plate completely spans the opening between the ends of the bail, with the serrations extending inwardly.

The frame, including both the bail and serrated plate, may be adjusted between the open, dotted line position of FIG. 1 and the closed, full line position of that figure in order to admit the snagged fishing line to the open space within the frame. Adjustment to the open position is accomplished by pivoting the bail and serrated plate relative to each other about pin 12. Adjustment to the closed position is accomplished by reversing the procedure. The two elements of the assembly then may be locked releasably to each other by insertion of a removable pin 18 through the end of the bail 10 and the edge of serrated plate 14.

Further to increase the use of the retriever there may be included grappling hook means attached to the bottom of the retriever and designed to engage the snag upon which the lure is fouled, thereby cooperating with serrated plate 14 in releasing the lure.

Although the grappling hook means employed may assume diverse configurations, it is preferred to employ a pair of hooks 20. Each of these comprises a perforated base 22 extending outwardly from which, at an angle to the plane of the base as well as to each other, are a pair of divergent prongs 24.

The base of serrated plate 14 preferably is tapered downwardly or outwardly and perforated at the apex. Accordingly the grappling hooks may be releasably affixed to the base by aligning the perforations and inserting a bolt 26 or other suitable fastener. This will mount the hooks in their working divergent relation, illustrated particularly in FIG. 2, in which position they are ready to engage snags on which the lure may be caught.

The manner of use of the retriever is as follows:

First, assume that fishing lure 30, attached through line 32 to rod 34, is snagged on kelp or weeds 36 or on some other underwater obstruction.

To retrieve the lure, the fisherman first attaches a stout retrieving line 38 to bail 10, near the top or central portion thereof. This line should be of sufficient length to reach to the snag.

He then opens the frame or ring formed by bail 10 and serrated plate 14 by removing pin 18. Fishing line 32 then is inserted into the interior of the ring which thereupon is closed and releasably locked in closed position by re-insertion of pin 18.

Thereafter fishing line 32 is held taut in the manner shown in FIG. 3 and the retriever allowed to slide down it, using it as a guide until the snag is reached. This will be evidenced by the fact that the retrieving line goes slack.

Since the diameter of the frame is comparatively large relative to the lure, it can be made to slide over it to the location where it hooks the snag. Then upon pulling upwardly on retrieving line 38, the snagged lure may be pulled free.

During this sequence of operation, grappling hooks 20 may assist by engaging the substance of the snag itself so that upon pulling in on the retrieving line the snag may be broken up or lifted bodily to the surface, whereupon the lure may be disengaged. This supplemental effect is of particular value in situations where the hooks may be deeply embedded in a branch or heavy kelp which may be broken off more easily than the hooks can be disengaged.

It is to be understood that the form of my invention herein shown and described is to be taken as a preferred example of the same and that various changes in the shape, size and arrangement of parts may be resorted to without departing from the spirit of my invention or the scope of the subjoined claims.

Having thus described my invention, I claim:
1. A fishing tackle retriever comprising:
   (a) a substantially flat plate member having inner and outer ends,
   (b) a plurality of teeth formed in a rectilinear row on the inner end of the plate member and disposed substantially in the plane of the latter and projecting in the direction of said inner end.
   (c) a bail member positioned substantially in the plane of said plate member and hinged at one end to the plate member for pivotal movement substantially in the plane of the plate member to releasably span the inner end of the latter inwardly thereof, and

(d) locking means releasably interengaging the opposite end of the bail member and the plate member for releasably securing the bail member in said spanning position, (e) the space between the teeth and spanning bail member being adapted to receive a fishing line freely therethrough and the bail member being adapted for connection of a retrieving line.

2. The retriever of claim 1 including a plurality of grappling hook means mounted on the opposite faces of the plate member adjacent the outer end thereof and diverging therefrom in the direction of the inner end of the plate member.

3. A fishing tackle retriever comprising:

(a) a substantially flat plate member having inner and outer ends, (b) a plurality of teeth formed in a rectilinear row on the inner end of the plate member and disposed substantially in the plane of the latter and projecting in the direction of said inner end, (c) a substantially symmetrical smooth bail member positioned substantially in the plane of said plate member and secured at one end to the plate member to span the inner end of the latter inwardly thereof, and (d) means adjacent the opposite end of the bail member providing an opening between said bail member and plate member for receiving a fishing line therethrough, (e) the space between the teeth and spanning bail member being adapted to receive a fishing line freely therethrough and the bail member being adapted for connection of a retrieving line to its central portion.

References Cited by the Examiner

UNITED STATES PATENTS

| | | | |
|---|---|---|---|
| 2,210,271 | 8/40 | Thwaits | 43—5 |
| 2,443,061 | 6/48 | Waltamath | 43—17.2 |
| 2,453,245 | 11/48 | McDonald | 43—17.2 |
| 2,479,448 | 8/49 | Woock | 43—17.2 |
| 2,760,810 | 8/56 | Smith. | |
| 2,915,845 | 12/59 | Hughes | 43—17.2 |

FOREIGN PATENTS

| | | |
|---|---|---|
| 958,971 | 9/49 | France. |
| 998,282 | 9/51 | France. |
| 617,392 | 2/49 | Great Britain. |
| 120,187 | 11/47 | Sweden. |

SAMUEL KOREN, *Primary Examiner.*